US010622014B2

(12) United States Patent
Hoerger et al.

(10) Patent No.: US 10,622,014 B2
(45) Date of Patent: *Apr. 14, 2020

(54) READ FROM A NON-TRIMMING PORTION OF A DATA TRACK WRITTEN TO MAGNETIC TAPE

(71) Applicant: Hewlett Packard Enterprise Development LP, Houston, TX (US)

(72) Inventors: Carl R Hoerger, Boise, ID (US); Geoffrey Stiles, Bristol (GB); Martin Dyer, Bristol (GB); Geoffrey W. D. Spratt, Boise, ID (US); Jeffrey S. McAllister, Boise, ID (US); Malcolm Grimwood, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,347

(22) Filed: Apr. 16, 2019

(65) Prior Publication Data

US 2020/0005825 A1 Jan. 2, 2020

Related U.S. Application Data

(63) Continuation of application No. 16/022,923, filed on Jun. 29, 2018, now Pat. No. 10,304,489.

(51) Int. Cl.
*G11B 19/04* (2006.01)
*G11B 15/093* (2006.01)
(Continued)

(52) U.S. Cl.
CPC ........ *G11B 19/041* (2013.01); *G11B 5/00847* (2013.01); *G11B 5/5508* (2013.01);
(Continued)

(58) Field of Classification Search
None
See application file for complete search history.

(56) References Cited

U.S. PATENT DOCUMENTS

| 5,847,892 A | 12/1998 | Goker |
| 6,130,792 A | 10/2000 | Goker |

(Continued)

OTHER PUBLICATIONS

IBM, "IBM TS3500 Tape Library Supports LTO Ultrium 8 Tape Drive Technology," Oct. 10, 2017, 23 pages, https://www-01.ibm.com/common/ssi/cgi-bin/ssialias?infotype=an&subtype=ca&appname=gpateam&supplier=897&letternum=ENUS117-077.

*Primary Examiner* — Tan X Dinh
(74) *Attorney, Agent, or Firm* — Hewlett Packard Enterprise Patent Department

(57) ABSTRACT

An example tape drive includes a magnetic tape head, an actuator, and a controller. The magnetic tape head includes a data write element to write a data track including data onto magnetic tape. The data track includes a non-trimming portion and a trimmable portion. The magnetic tape head also includes a data read element to read the data written to the non-trimming portion of the data track to verify the accuracy of the data. The controller positions the magnetic tape head via the actuator to allow (i) the data write element to write the first data track, and (ii) the data read element to read the second portion of the first data track. From the read data, a determination may be made as to whether the data was written to the non-trimming portion of the data track with a threshold level of accuracy.

20 Claims, 8 Drawing Sheets

(51) Int. Cl.
  *G11B 5/008*  (2006.01)
  *G11B 20/18*  (2006.01)
  *G11B 5/55*  (2006.01)
  *G11B 15/43*  (2006.01)

(52) U.S. Cl.
  CPC ............ *G11B 15/093* (2013.01); *G11B 15/43* (2013.01); *G11B 20/18* (2013.01)

(56) References Cited

U.S. PATENT DOCUMENTS

| | | |
|---|---|---|
| 6,883,122 B2 | 4/2005 | Maple et al. |
| 8,199,434 B2 | 6/2012 | Biskeborn et al. |
| 8,665,545 B2 | 3/2014 | Coker et al. |
| 8,896,958 B2 | 11/2014 | Fasen et al. |
| 8,976,482 B2 * | 3/2015 | Cherubini ............... G11B 5/187 360/261.1 |
| 9,007,712 B1 | 4/2015 | Biskeborn et al. |
| 9,208,809 B2 | 12/2015 | Biskeborn et al. |
| 9,449,628 B2 | 9/2016 | Biskeborn et al. |
| 9,460,751 B2 | 10/2016 | Feldman |
| 9,613,646 B2 | 4/2017 | Ahmad et al. |
| 9,761,272 B1 | 9/2017 | Biskeborn |
| 9,911,443 B2 | 3/2018 | Biskeborn et al. |
| 9,921,767 B2 | 3/2018 | Hassner et al. |
| 10,304,489 B1 * | 5/2019 | Hoerger ................. G11B 20/18 |
| 2006/0152846 A1 | 7/2006 | Tsutsui |
| 2015/0043101 A1 | 2/2015 | Biskeborn et al. |
| 2015/0170691 A1 | 6/2015 | Biskeborn et al. |
| 2016/0012832 A1 * | 1/2016 | Biskeborn .......... G11B 5/00826 360/75 |
| 2019/0096435 A1 * | 3/2019 | Gao ..................... G11B 5/5578 |

* cited by examiner

READ FROM A NON-TRIMMING PORTION OF A DATA TRACK WRITTEN TO MAGNETIC TAPE

CROSS REFERENCE TO RELATED APPLICATION

This is a continuation of U.S. application Ser. No. 16/022,923, filed Jun. 29, 2018, which is hereby incorporated by reference in its entirety.

BACKGROUND

Tape drives are used to back up and archive data to magnetic tape. In a tape drive, the data is generally written to the magnetic tape in parallel tracks along a length of the magnetic tape. The writing of the data is carried out using a magnetic tape head that is disposed within the tape drive. The magnetic tape head may include a plurality of bumps including a number of data write elements, or channels, utilized to write the data onto the magnetic tape.

In addition to the data write elements, the plurality of bumps may include a number of data read elements, or channels, utilized to read the data written to the magnetic tape. After the data is written to the magnetic tape via a data write element, a data read element disposed downstream of the data write element in the direction of travel of the magnetic tape may read the written data to verify the accuracy of the written data. In the event errors are detected in the written data, the written data may be corrected or re-written onto the magnetic tape.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
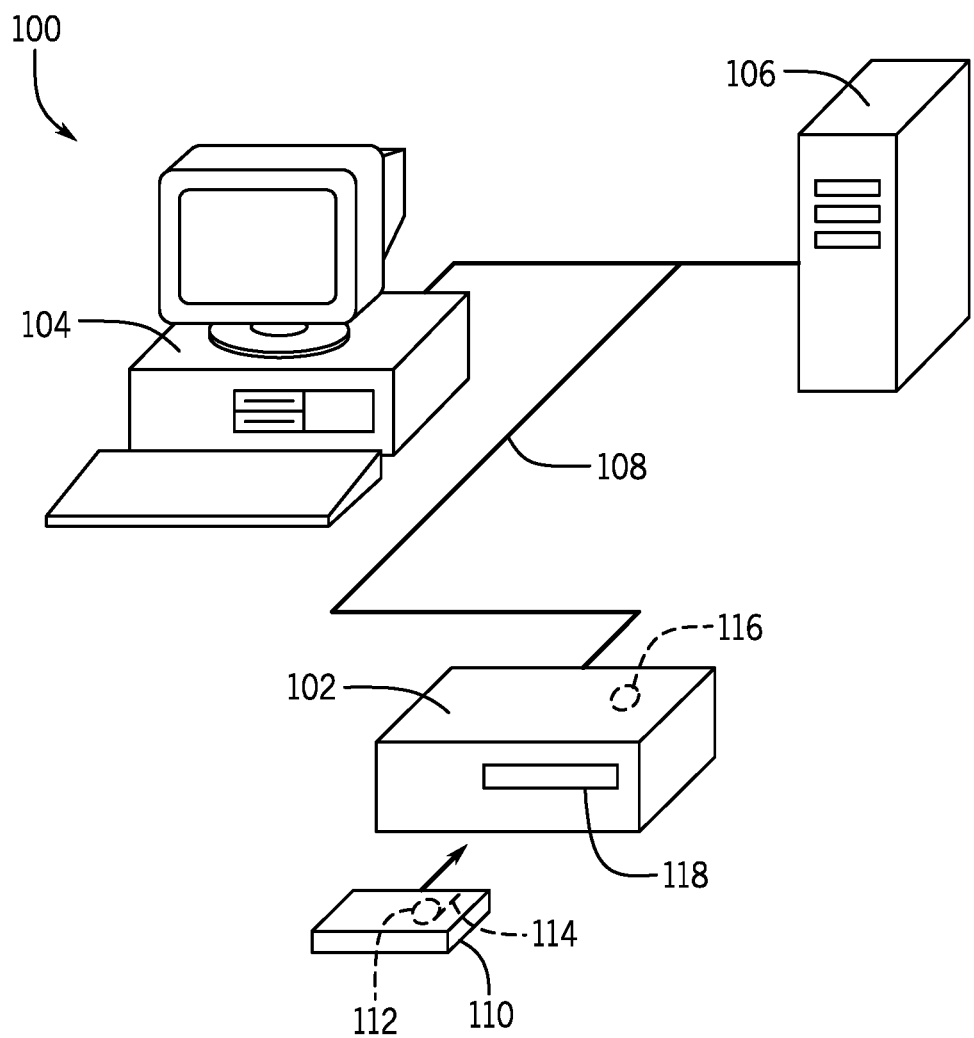
FIG. 1 is a schematic of an example computing system, according to one or more embodiments of the disclosure.

Illustrative embodiments of the subject matter claimed below will now be disclosed. In the interest of clarity, not all features of an actual implementation are described in this specification. It will be appreciated that in the development of any such actual embodiment, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Moreover, examples herein are intended to be illustrative only and are presented for discussion purposes and not by way of limitation.

Generally, tape drives (e.g., linear tape drives) write multiple tracks of data across the width of the magnetic tape simultaneously with multiple data write elements. To increase storage capacity of the magnetic tape, the data tracks may be written such that a portion of each data track is overwritten by another data track. This overwriting, commonly referred to as "shingling", or "trimming" the data track, allows for an increased number of data tracks to be written to the magnetic tape, resulting in increased storage capacity of the magnetic tape.

However, as a result of the increasing number of data tracks and thus the resulting narrowing width of each data track, each data read element is often positioned over the center of a respective data track written by a respective data write element to account for slight misalignments between the data read element and the associated data write element disposed upstream of the data read element along the direction of travel of the magnetic tape. Although positioning each data read element in the center of the respective data track prevents the data read element from reading data outside of the data track, the central positioning of the data read element does not allow for the data read element to read exclusively from a non-trimming portion of the data track that will remain after trimming. Accordingly, the data read element may verify the accuracy of only a portion of the untrimmed portion of the data track. Thus, the non-trimming portion of the data track (e.g., at or near a longitudinally-extending edge of the data track) may contain errors that are not detected when the track is read by the data read element, when the data read element does not read from a region of the non-trimming portion that contains error(s). In such examples, the errors in the data track may be caused by defect(s) in a data write element caused by, for example, corrosion, wear, etc.

Embodiments of the present disclosure are directed to tape drives and methods for verifying the accuracy of data written to magnetic tape via the tape drives. Example embodiments allow for the adjustment of a magnetic tape head of the tape drive to align a data read element with a non-trimming portion of a data track. In one or more embodiments, the non-trimming portion of a data track may be the portion of the data track that is to be untrimmed after another data track is written onto the magnetic tape. The verification may be carried out on a scratch portion of the magnetic tape and may include the use of an error correction engine to detect and, in some embodiments, correct errors in the data written onto the magnetic tape. In one or more example embodiments, the data track may be read in a single pass without having to carry out a separate read/verify pass, which would involve the use of twice as many drives for the same data throughput.

More particularly, in one embodiment of the present disclosure, a tape drive may include a magnetic tape head, an actuator, a controller, and a computer-readable storage medium. The magnetic tape head may include a data write element and a data read element separated from the data write element along an axis parallel to a longitudinal axis of the magnetic tape head. The data write element may have first and second write portions adjacent along an axis parallel to a transverse axis of the magnetic tape head that is perpendicular to the longitudinal axis, where the data read element is offset from the first write portion of the data write element relative to the longitudinal axis. The actuator may adjust a position of the magnetic tape head. The computer-readable storage medium may include instructions executable by the controller to: tilt, with the actuator, the magnetic tape head about a zenith axis of the magnetic tape head to a tilted position, the zenith axis perpendicular to both the longitudinal axis and the transverse axis of the magnetic tape head; with the data write element, write a set of data onto a magnetic tape as a data track, the data track including a non-trimming portion written by the first write portion and a trim mable portion written by the second write portion, with the data write element in the tilted position in which the data read element is disposed to read from a larger area of the non-trimming portion than if the magnetic tape head were in a nominal position in which the longitudinal axis were substantially parallel with the direction of tape travel; while the magnetic tape head is in the tilted position, read from the non-trimming portion of the data track with the data read element; and determine, from the read data, whether the set of data was written to the non-trimming portion of the data track with a threshold level of accuracy.

In another embodiment of the present disclosure, a non-transitory computer-readable medium is provided and stores computer-executable instructions, which when executed, cause a computer to: with a first data write element disposed on a first write bump of a magnetic tape head, write a first data track including a first set of data onto the magnetic tape moving in a first direction, the first data track including a non-trimming portion written by a first write portion of the first data write element and a trimmable portion written by a second write portion of the first data write element, where the first and second write portions of the first data write element are adjacent along an axis parallel to a transverse axis of the magnetic tape head; adjust the magnetic tape head to align a data read element disposed on a read bump of the magnetic tape head with the non-trimming portion of the first data track, where the data read element is separated from the first data write element along an axis parallel to a longitudinal axis of the magnetic tape head, the longitudinal axis of the magnetic tape head is perpendicular to the transverse axis of the magnetic tape head, and the data read element is offset from the first write portion of the data write element relative to the longitudinal axis; read exclusively from the non-trimming portion of the first data track with the data read element when the trimmable portion of the first data track has not been overwritten; and determine, from the read data, whether the first set of data was written to the non-trimming portion of the first data track with a threshold level of accuracy.

In another embodiment of the present disclosure, a method is provided for verifying the accuracy of data written to a magnetic tape. The method may include, with a first data write element disposed on a first write bump of a magnetic tape head, writing a first data track including a first set of data onto the magnetic tape moving in a first direction. The method may also include, with the first data write element disposed on the first write bump of the magnetic tape head, writing a second data track including a second set of data onto the magnetic tape moving in the first direction, the second data track overwriting the first data track and including a non-trimming portion written by a first write portion of the first data write element and a trimmable portion written by a second write portion of the first data write element, where the first and second write portions of the first data write element are adjacent along an axis parallel to a transverse axis of the magnetic tape head. The method may further include adjusting the magnetic tape head to align a data read element disposed on a read bump of the magnetic tape head with the non-trimming portion of the second data track, where the data read element is separated from the first data write element along an axis parallel to a longitudinal axis of the magnetic tape head perpendicular to the transverse axis of the magnetic tape head, and the data read element is offset from the first write portion of the data write element relative to the longitudinal axis. The method may also include reading exclusively from the non-trimming portion of the second data track with the data read element when the trimmable portion of the second data track has not been overwritten, and determining, from the read data, whether the second set of data was written to the non-trimming portion of the second data track with a threshold level of accuracy.

Turning now to the Figures, FIG. 1 is a schematic of a computing system 100, according to one or more embodiments. The computing system 100 may include a data storage device, such as tape drive 102, communicably coupled to a computer 104 or a network server 106, or both, via a wired connection 108. However, the present disclosure is not limited thereto, and in one or more embodiments, the tape drive 102 may be communicably coupled to the computer 104 or the network server 106, or both, via a wireless connection, such as a wide area network (WAN), local area network (LAN), or the Internet.

The computer 104 or the network server 106, or both, may be configured to read data from and write data to the tape drive 102. The computer 104 and the network server 106, together or individually, may form a host system for the tape drive 102. In the illustrated embodiment of FIG. 1, the tape drive 102 is a data storage and retrieval device that is configured in the form of a stand-alone computer tape drive. In other embodiments, the tape drive 102 may be disposed within the computer 104 or the network server 106. For example, the tape drive 102 may be supported in a bay inside a housing of the computer 104 or the network server 106.

As shown in FIG. 1, the tape drive 102 is configured to use tape cartridges such as a data tape cartridge 110. To that end, the data tape cartridge 110 may be loaded into the tape drive 102 via a cartridge slot 118. The data tape cartridge 110 may be a tape cartridge having a single reel 112. In other embodiments, the data tape cartridge 110 may include two reels 112. The data tape cartridge 110 may include a magnetic tape carrier in the form of a reel 112 and magnetic tape 114 that is wound onto the reel 112. In addition, a second reel 116 may be included within the tape drive 102 and configured to engage the magnetic tape 114. Thus, the second reel 116 works with the reel 112 to form a magnetic tape carrier.

In one or more embodiments, the magnetic tape 114 is configured to have a width of approximately one-half inch (12.7 mm). As configured, the magnetic tape 114 also has a length extending in a direction perpendicular to the width, with a number of parallel tracks being defined across the width of the magnetic tape 114. Such tracks extend in the direction of the length of the magnetic tape 114, and are used to store data as well as servo information.

Figure 2:
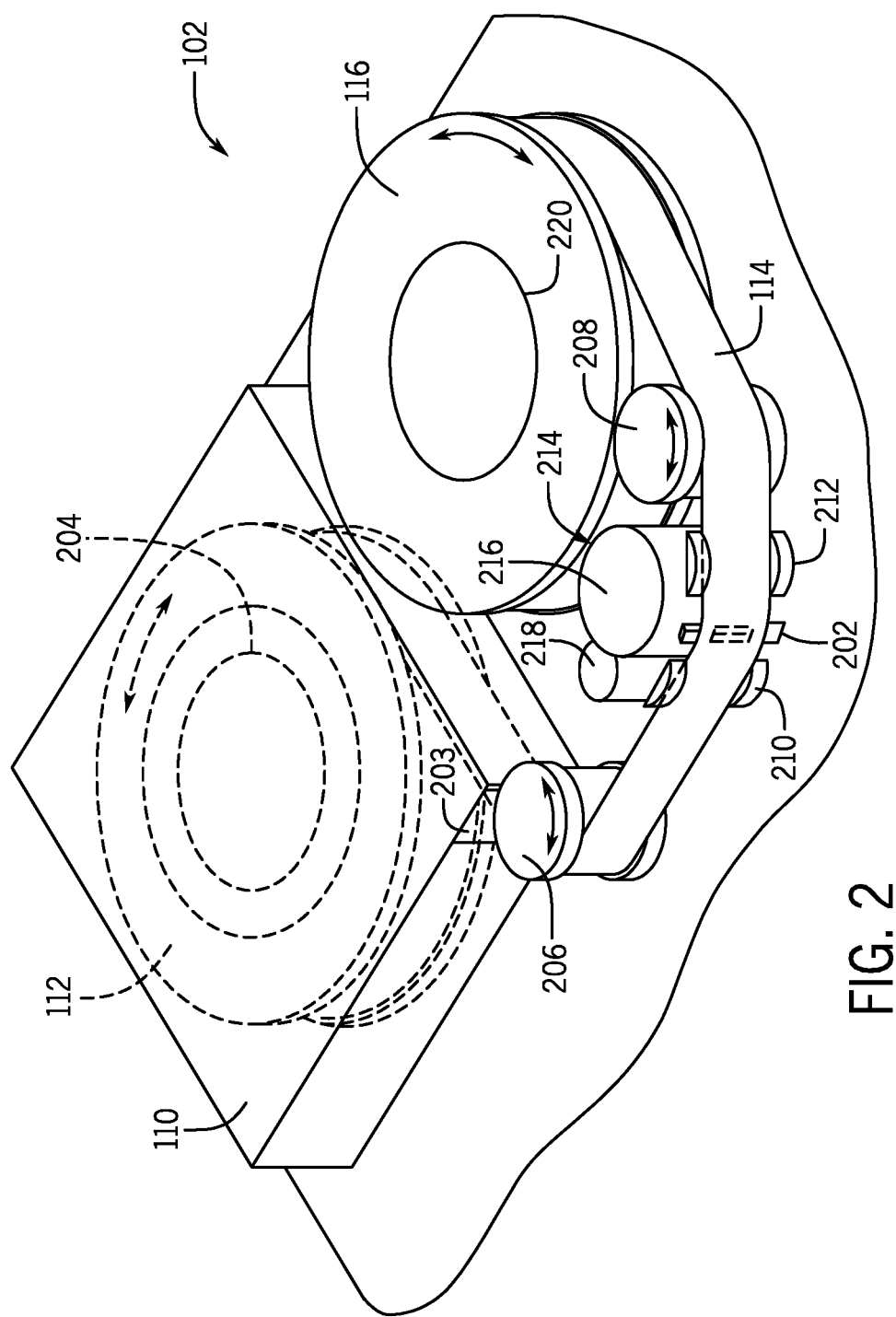
FIG. 2 is a schematic of the internal operating configuration of an example tape drive after the loading of a data tape cartridge therein, according to one or more embodiments of the disclosure.

FIG. 2 is a schematic of an internal operating configuration of the tape drive 102 after the loading of the data tape cartridge 110 into the tape drive 102 via the cartridge slot 118, according to one or more embodiments of the disclosure. Like numbered items are as described with respect to FIG. 1 and will not be discussed again in detail. The loading of the data tape cartridge 110 may be performed such that the magnetic tape 114 is positioned for linear movement along a transducer, such as a magnetic tape head 202

As shown in FIG. 2, the magnetic tape 114 exits the data tape cartridge 110 via an exit aperture 203. A motor 204 may drive the reel 112, and in some embodiments, another motor (not shown) may be utilized to drive the second reel 116 to effect movement of the magnetic tape 114 in the tape drive 102. The magnetic tape 114 may then travel around roller guides 206 and 208, as well as non-rolling guides 210 and 212. In some embodiments, the non-rolling guides 210 and 212 may be omitted. The movement of the magnetic tape 114 may be such that tension is applied to the magnetic tape creating pressure between the tape and the tape head 202 during the normal operation of the tape drive 102.

The magnetic tape head 202 may be supported for multi-directional movement by an actuator 214. The actuator 214 is shown in FIG. 2 in a simplified form as a cylindrical body with an actuator housing 216. However, it is to be understood that the actuator 214 may be configured to enable both a tilting movement of the magnetic tape head 202 about a zenith axis thereof (shown in FIG. 6 and discussed below) and movement transverse to the travel direction of the magnetic tape 114 and in response to input from a controller 218.

The controller 218 may include at least one of a processor, an application specific integrated circuit (ASIC), memory, and the like. The controller 218 may be part of control circuitry (shown in FIG. 7 and discussed below) that directs the functioning of the hardware within the tape drive 102. For example, the controller 218 may direct the actuator 214 to effect the movement of the magnetic tape head 202. Such a movement of the magnetic tape head 202 may allow for the magnetic tape head 202 to be properly positioned for writing data onto the magnetic tape 114 in the form of data tracks and/or reading the data tracks written onto the magnetic tape 114.

In one or more embodiments, the second reel 116, i.e., the reel that is built into the tape drive 102, may include a leader block assembly 220 including a number of tape leaders (not shown). The leader block assembly 220 may enable the loading and unloading of the magnetic tape 114 during the loading and unloading of the data tape cartridge 110 within the tape drive 102. The leader block assembly 220 may be any of a number of different types of leader block assemblies known to those of ordinary skill in the art.

Figure 3:
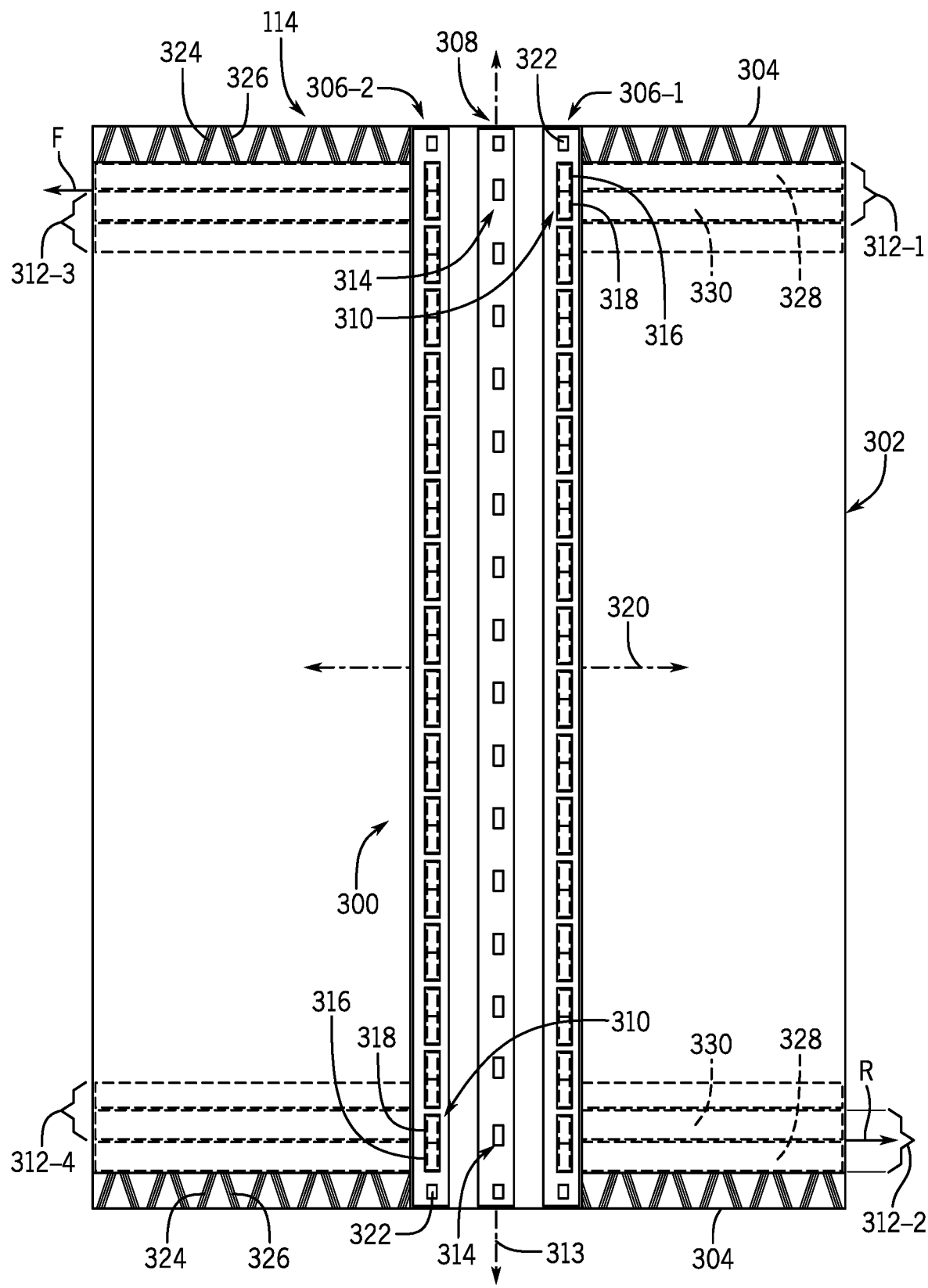
FIG. 3 is a schematic of an example magnetic tape head suitable for use in the tape drive and disposed over a portion of magnetic tape, according to one or more embodiments of the disclosure.

Referring now to FIG. 3 with continued reference to FIGS. 1 and 2, FIG. 3 is a schematic of an example magnetic tape head 300 suitable for use in the tape drive 102 and disposed in a nominal position over a portion of the magnetic tape 114, according to one or more embodiments. Like numbered items are as described with respect to FIGS. 1 and 2. For simplicity, the portion of the magnetic tape 114 illustrated is a single data band 302 bordered by servo bands 304; however, it will be appreciated that the magnetic tape 114 may include a plurality of data bands (e.g., four data bands) and thus there is no intent to limit the present disclosure to a single data band.

The magnetic tape head 300 is configured to convert electrical data signals received from the computer 104 or the network server 106, for example, to magnetic fluctuations that are contained within the magnetic tape 114, and vice versa. To that end, the magnetic tape head 300 may include a plurality of bumps 306, 308 to read or write data to the magnetic tape 114 while the magnetic tape 114 travels in both directions relative to the magnetic tape head 300. More particularly, as illustrated in FIG. 3, the magnetic tape head 300 may be designed for write-read ("WR") operations and may include two write bumps 306-1 and 306-2 (also referred to collectively as write bumps 306 or individually and generally as a write bump 306) and a read bump 308 sandwiched or otherwise disposed between the two write bumps 306. Such a head configuration is referred to as a three bump head. Accordingly, as configured, the read bump 308 may be downstream from either write bump 306 depending on the direction of travel of the magnetic tape 114. In other configurations, the magnetic tape head 300 may be configured as two bump head, where each bump includes both the data write elements 310 and the data read elements 314. Accordingly, in a two head bump configuration, the upstream bump is configured to perform the write operation, and the downstream bump is configured to perform the read operation, Each of the write bumps 306 may include a plurality of data write elements 310 for writing data onto the magnetic tape 114 in parallel data tracks 312-1 through 312-4 (also referred to collectively as data tracks 312 or individually and generally as a data track 312) along a length of the magnetic tape 114. The data write elements 310 in each write bump 306 may be arranged along an axis parallel to a transverse axis 313 of the magnetic tape head 300. In one or more embodiments, each of the data write elements 310 may include a plurality of data write portions 316, 318. As illustrated in FIG. 3, each of the data write elements 310 may include a first write portion 316 and a second write portion 318 adjacent to one another along an axis parallel to the transverse axis 313 of the magnetic tape head 300. The first write portion 316 and the second write portion 318 are illustrated with separate dotted lines and reference numbers in FIG. 3 to indicate separate regions of the data write element 310; however, in one or more embodiments, the first write portion 316 and the second write portion 318 of the data write element 310 may form a single unitary structure and may perform separate functions as will be described in further detail below.

The read bump 308 may include a plurality of data read elements 314 for reading the data written onto the magnetic tape 114. The data read elements 314 may be arranged along the transverse axis 313 or an axis parallel to the transverse axis 313 of the magnetic tape head 300, and each data read element 314 may be separated from an associated data write element 310 along an axis parallel to a longitudinal axis 320 of the magnetic tape head 300. Accordingly, each data read element 314 is offset from a respective first write portion 318 of the data write element 310 relative to the longitudinal axis 320 of the magnetic tape head 300. The longitudinal axis 320 is perpendicular to the transverse axis 313 of the magnetic tape head 300. The movement of the magnetic tape head 300 may allow the data write elements 310 and the data read elements 314 on the magnetic tape head 300 to be properly positioned over the magnetic tape 114 to respectively write and read the parallel data tracks 312.

As shown in FIG. 3, each of the write bumps 306 has sixteen data write elements 310 and the read bump 308 has sixteen data read elements 314. However, the present disclosure is not limited thereto, and in other embodiments, different numbers of data write elements 310 and/or data read elements 314 can be employed. In addition, it will be appreciated that although the "bump" in some embodiments is a raised area on the magnetic tape head 300 relative to the rest of the magnetic tape head 300 and having a column of data read elements 314 or data write elements 310, the "bump" in other embodiments may not be raised above the rest of the magnetic tape head 300.

The magnetic tape head 300 may be manufactured using thin film processes such as micro-lithography, evaporation, sputtering, ion milling, electroplating, and wet etching to produce magnetic micro-structures on one side of a substrate such as silicon carbide (SiC), aluminum titanium carbide (AlTiC), and ferrite. For example, a thin film process may be utilized to pattern the data write elements 310 and the data read elements 314 onto a substrate, which are then subsequently machined into bumps 306, 308 and adhered together. The present disclosure is not limited to a particular manufacturing technique, and the magnetic tape head 300 of the present disclosure may be manufactured in any manner that provides the described read/write element arrangement. Further, the present disclosure is not limited to any particular manufacturing process for the data write elements 310 and the data read elements 314 and any suitable process for manufacturing the described data read elements 314 and data write elements 310 may be employed.

Each of the write bumps 306 and the read bump 308 may include a plurality of servo elements 322 (only two indicated) for reading servo code from the servo bands 304 bordering each data band 302 of the magnetic tape 114. The servo bands 304 may be spaced on the magnetic tape 114 to match the distance between the servo elements 322 on the magnetic tape head 300. As shown in FIG. 3, each of the write bumps 306 and the read bump 308 has a servo element 322 at each end thereof. However, in other embodiments, the write bumps 306 and/or the read bump 308 may include additional servo elements 322 at one or both ends. In one or more embodiments, the servo elements 322 may have a physical construction identical to the physical construction of the data read elements 314 and/or the data write elements 310.

The servo code may be pre-written to the servo bands 304 by another servo writer that may, in some embodiments, be included in the tape drive 102. In other embodiments, the plurality of servo elements 322 may be utilized to write the servo code to the servo bands 304. The servo elements 322, in conjunction with the controller 218, may aid the positioning of the magnetic tape head 300 such that the data read elements 314 or the data write elements 310 are properly aligned with the desired data tracks 312 on the magnetic tape 114. For example, the servo elements 322 disposed on respective ends of the read bump 308 may be positioned via the controller 218 to align a data read element 314 with non-trimming portion of a data track 312, as will be discussed in greater detail below.

To that end, as illustrated in FIG. 3, each servo band 304 is configured to provide both an indication of position (and speed) in the direction of travel of the magnetic tape 114, and an indication of the transverse position of the magnetic tape 114 relative to the servo element 322 reading the servo band 304. In one or more embodiments, the tape drive 102 includes a timing-based demodulation scheme for sensing the servo information on the magnetic tape 114. The position of the magnetic tape head 300 relative to the width of the magnetic tape 114 is derived from the relative timing of azimuthally sloped transitions 324 and 326. Accordingly, the servo code includes two elements: transitions 324, which are written with a forward slope or positive azimuth angle; and transitions 326, which are written at a backward slope or negative azimuth angle and may or may not be symmetrical with respect to the transitions 324. The time difference between read back pulses generated using a servo element 322 is used to indicate the servo element's position in the servo band 304. By using a high resolution timing measurement, a high resolution position measurement is achieved.

As disclosed above, the plurality of data write elements 310 may write a plurality of data tracks 312 onto the magnetic tape 114. More particularly, as shown in FIG. 3, four parallel data tracks 312 are shown written onto the data band 302 of the magnetic tape 114. However, the present disclosure is not limited to, and in other embodiments, various numbers of data tracks 312 may be employed. For example, eight, twelve, sixteen, or thirty-two data tracks 312 may be employed.

As shown in FIG. 3, the four parallel data tracks 312 are written onto the magnetic tape 114 in a shingled manner in which two data tracks 312-1 and 312-3 are written in a forward direction and the remaining two data tracks 312-2 and 312-4 are written in a reverse direction. The data tracks 312 are written in alternating directions creating a serpentine-like pattern. To that end, data track 312-1 is written onto the length of the magnetic tape 114 with the data write element 310 of the write bump 306-1 of the magnetic tape head 300 while the magnetic tape 114 is moving in a forward direction (arrow F) parallel to the longitudinal axis 320 of the magnetic tape head 300. The first write portion 316 of the data writing element 310 writes a non-trimming portion 328 of the data track 312-1, and the second write portion 318 of the data writing element writes a trimmable portion 330 of the data track 312-1. The magnetic tape 114 is reversed in direction (arrow R) and data track 312-2 is written on the length of the magnetic tape 114 with the data write element 310 of the write bump 306-2 of the magnetic tape head 300. The first write portion 316 of the data write element 310 writes a non-trimming portion 328 of the data track 312-2, and the second write portion 318 of the data write element writes a trimmable portion 330 of the data track 312-2. In each direction, the first write portion 316 of the respective data write elements 310 is positioned closer to the nearest servo element 322 than the second write portion 318.

The magnetic tape 114 is again reversed in direction and a data track 312-3 is written on the length of the magnetic tape 114 with the data write element 310 of the write bump 306-1 of the magnetic tape head 300 in the forward direction (arrow F). As can be seen, the data track 312-3 overwrites the trimmable portion 330 of the data track 312-1, which may be referred to herein as "trimming" data track 312-1. As used herein, writing a second data track parallel to a previously written first data track such that the second data track overwrites a first data portion of the first data track without overwriting a second data portion of the first data track (e.g., where the first and second data portions have their lengths in a direction of tape travel) may be referred to as "trimming" the first data track. In a similar fashion, the magnetic tape 114 is reversed again in direction (arrow R) and a data track 312-4 is written on the length of the magnetic tape 114 with the data write element 310 of the write bump 306-2 of the magnetic tape head 300. As can be seen, data track 312-4 overwrites the trimmable portion 330 of the data track 312-2 to thereby trim data track 312-2. The serpentine-like pattern and shingling may be repeated for any additional data tracks written onto the magnetic tape 114, according to one or more embodiments.

Each of the data tracks 312 may be read by the data read element 314 associated with the data write element 310 having written the respective data track 312. In examples described herein, a data read element 314 and a data write element 310 referred to as "associated" with one another are a data read element 314 and a data write element 310 aligned with one another along an axis parallel to the longitudinal axis 320 of the magnetic tape head 300. Each data read element 314 may be disposed downstream from an associated data write element 310 in the direction of travel of the magnetic tape 114 (e.g., such that an area of the magnetic tape 114 written by the associated data write element 310 reaches the data read element 314 after the area is written by the associated data write element 310 as the magnetic tape 114 travels in a particular tape travel direction). In some embodiments, each of the data read elements 314 reads the data written onto respective data tracks 312 as the data is being written onto the data tracks 312 (i.e., during a same pass of the tape). In other embodiments, each of the data read elements 314 reads the data written onto the respective data tracks 312 during separate passes after the data has been written onto the magnetic tape 114.

The data read by each data read element 314 may be verified for accuracy. As shown in FIG. 3, the data read element 314 may be centered with respect to the width of the respective data track 312 during reading to account for slight misalignments between the data read element 314 and the associated data write element 310 disposed upstream of the data read element 314 along the direction of travel of the magnetic tape 114. In some instances, a portion (not shown) of a data write element (e.g., first write portion 316) may be damaged due to corrosion, wear, etc.

Accordingly, such a portion may fail to accurately write the data onto the magnetic tape, whereas the remaining portion of the data write element (e.g., second write portion 318) may write accurate data. Although positioning each data read element in the center of the respective data track prevents the data reader element from reading data outside of the data track, the central positioning of the data read element does not allow for the data read element to read exclusively from a portion of the data track (i.e., a "non-trimming portion" herein) that will not be subsequently overwritten by later trimming of the data track. Accordingly, the data read element positioned centrally over a data track may verify the accuracy of the data written to the data track based on reading from some of the non-trimming portion of the data track and some of the data track that will be overwritten by trimming, and as such, is not a good indication of whether the non-trimming portion (that remains after the data track is trimmed) was written with a threshold level of accuracy (e.g., few enough errors). For example, area(s) of the non-trimming portion of the data track that were not actually read by the read head during the read process to verify the accuracy of the written data may contain undetected errors (e.g., at or near an outer edge of the data track). For example, this may be due to the portion of the data write element that wrote the non-trimming portion of the data track being damaged (e.g., by corrosion, wear, etc.).

Thus, in some embodiments, the magnetic tape head 300 may be adjusted such that respective read element(s) may read exclusively from the respective non-trimming portion(s) 328 of data track(s) 312 written to the magnetic tape. For example, one or more of the servo elements 322 on the read bump 308 may be utilized to position a data read element 314 to align with the non-trimming portion 328 of a respective data track 312 to read exclusively from the non-trimming portion 328. By doing so, the non-trimming portion 328 may be read, such that any errors in the data written onto the non-trimming portion 328 of the data track 312 may be detected, and in some embodiments, corrected or re-written farther down the magnetic tape 114. In instances in which the data is re-written, the data may include an indicator that the previously written data was in error.

Figure 4:
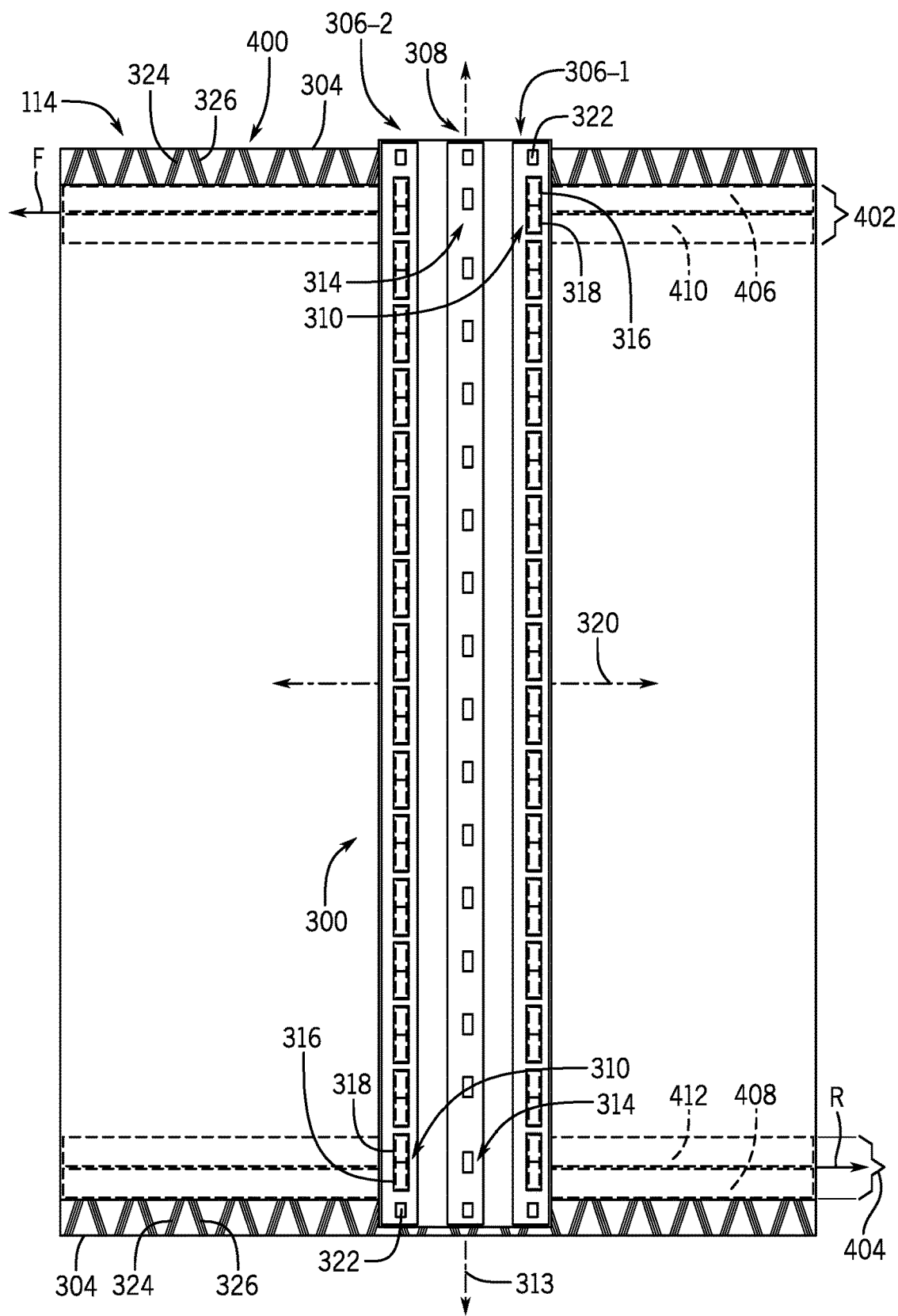
FIG. 4 illustrates the magnetic tape head of FIG. 3 disposed over a scratch portion of the magnetic tape, according to one or more embodiments of the disclosure.

In some of the disclosed embodiments, the magnetic tape head 300 may be adjusted before or after the writing of one or more data tracks to a scratch portion of the magnetic tape 114. For example, FIG. 4 illustrates the magnetic tape head 300 of FIG. 3 disposed over a scratch portion 400 of the magnetic tape 114, according to one or more embodiments. Like numbered items are as described with respect to FIGS. 1-3 and will not be discussed again in detail. As shown, a data track 402 is written in the forward direction (arrow F) and another data track 404 is written in the reverse direction (arrow R) on a length of the scratch portion 400 of the magnetic tape 114 determined by the controller 218 (see FIGS. 2 and 7).

In one or more embodiments, the controller 218 may determine respective non-trimming portions 406, 408 and trimmable portions 410, 412 of the data tracks 402, 404. The non-trimming portions 406, 408 are portions of the respective data tracks 402, 404 that would remain untrimmed if another data track (not shown) was written to the scratch portion 400 of the magnetic tape 114. The trimmable portions 410, 412 are portions of the respective data tracks 402, 404 that would be overwritten by the other data track. The non-trimming portions 406, 408 may be written by first write portions 316 of the data write elements 310 disposed on respective write bumps 306, and the trimmable portions 410, 412 may be written by respective second write portions 318 of the data write elements 310 disposed on respective write bumps 306.

The controller 218 may further position, via the servo elements 322 and the actuator 214, a data read element 314 to align with the non-trimming portion 406 of the data track 402 that would remain untrimmed if another data track was written onto the scratch portion 400 of the magnetic tape 114 in the forward direction (arrow F) to overwrite trimmable portion 410. The magnetic tape head 300 may be repositioned when the magnetic tape 114 is moved in the reverse position and the controller 218 may further position, via the servo elements 322, the data read element 314 to align with the non-trimming portion 408 of the data track 404 that would remain untrimmed if another data track was written onto the scratch portion 400 of the magnetic tape 114 in the reverse direction (arrow R) to overwrite trimmable portion 412. The data in each of the non-trimming portions 406, 408 of the data tracks 402, 404 may then be verified for accuracy.

Figure 5:
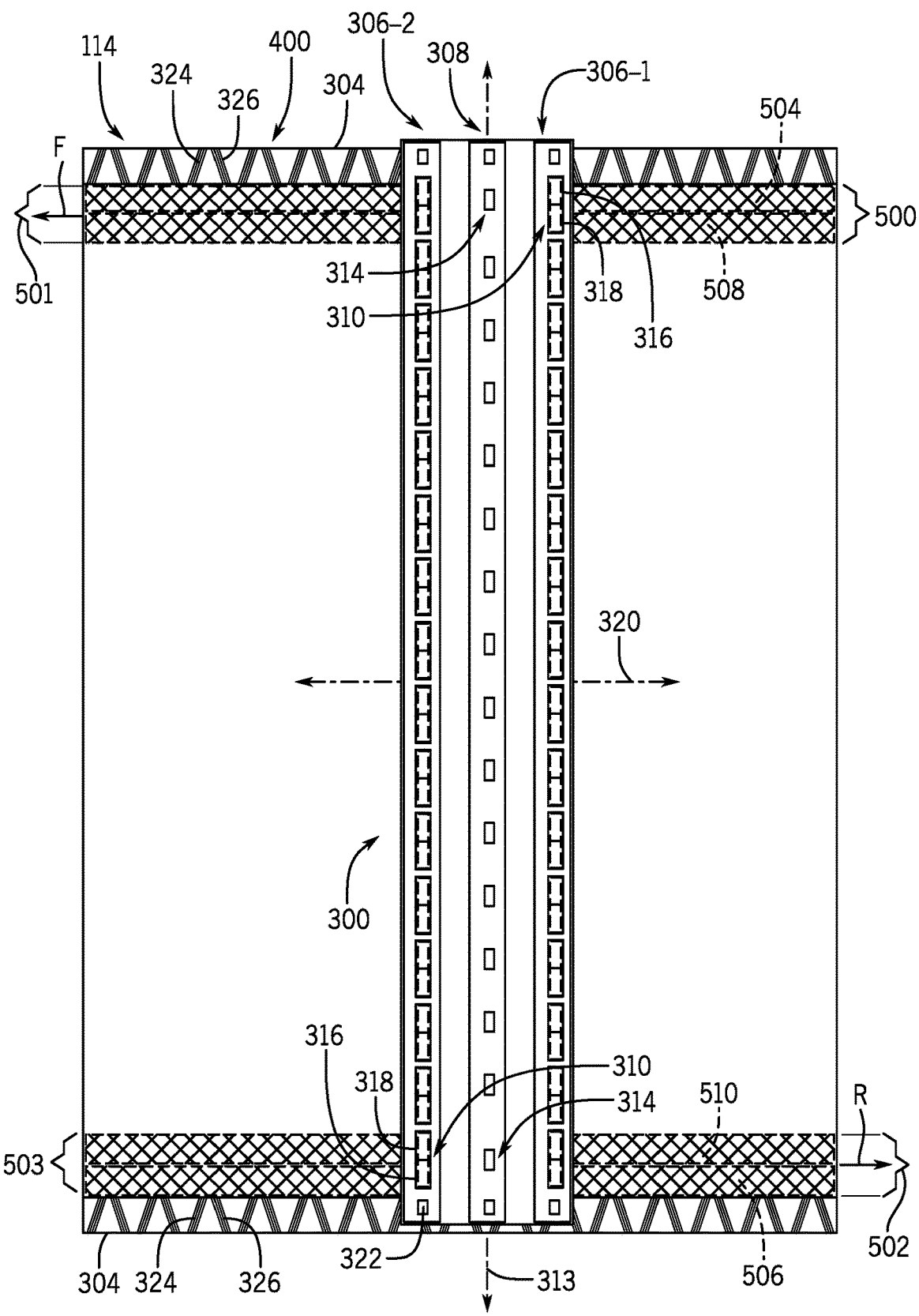
FIG. 5 illustrates the magnetic tape head of FIG. 3 disposed over a scratch portion of the magnetic tape, according to one or more embodiments of the disclosure.
Figure 7:
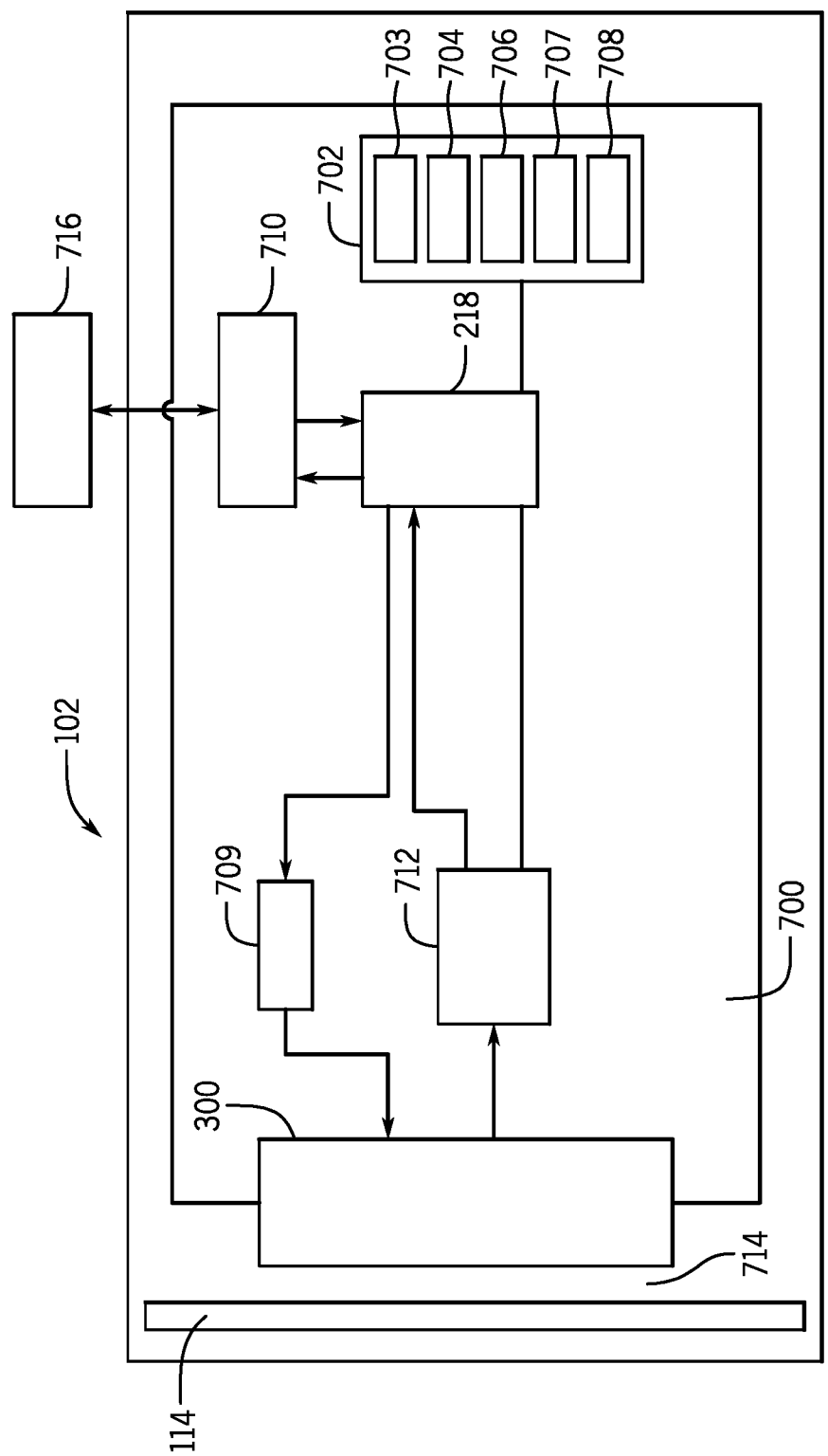
FIG. 7 is a schematic of the tape drive including the magnetic tape head of FIGS. 3-6 and control circuity communicably coupled to the magnetic tape head, according to one or more embodiments of the disclosure.

In another embodiment, as shown in FIG. 5, a data track 500 is written in the forward direction (arrow F) and another data track 502 is written in the reverse direction (arrow R) on a length of the scratch portion 400 of the magnetic tape 114 determined by the controller 218 (see FIGS. 2 and 7). A second set of data tracks 501, 503 is written onto the magnetic tape 114, thereby overwriting (shown as cross hatching) the first set of data tracks 500, 502. Specifically, data track 501 is written in the forward direction (arrow F) to overwrite the data track 500, and data track 503 is written onto the magnetic tape 114 in the reverse direction (arrow R) to overwrite the data track 502. The overwriting of data tracks 500, 502 may be carried out to verify the ability of the magnetic tape head 300 to write accurately on previously-written magnetic tape.

The controller 218 may determine respective non-trimming portions 504, 506 and trimmable portions 508, 510 of the second set of data tracks. The non-trimming portions 504, 506 are portions of the respective second data tracks that would remain untrimmed if trimmed by a another set of data tracks (not shown) written to the scratch portion 400 of the magnetic tape 114 written to overwrite a portion of the second set of data tracks. The trimmable portions 508, 510 are portions of the respective second data tracks that would be overwritten by an additional set of data tracks. The non-trimming portions 504, 506 may be written by first write portions 316 of the data write elements 310 disposed on respective write bumps 306, and the trimmable portions 508, 510 may be written by respective second write portions 318 of the data write elements 310 disposed on respective write bumps 306.

The controller 218 may position, via the servo elements 322, a data read element 314 to align with the non-trimming portion 504 of the second data track that would remain untrimmed if another data track was written onto the scratch portion 400 of the magnetic tape 114 in the forward direction (arrow F) to overwrite trimmable portion 508. The magnetic tape head 300 may be repositioned when the magnetic tape 114 is moved in the reverse position and the controller 218 may further position, via the servo elements 322, the data read element 314 to align with the portion 506 of the second data track that would remain untrimmed if another data track was written onto the scratch portion 400 of the magnetic tape 114 in the reverse direction (arrow R) to overwrite trimmable portion 510. The data in each of the non-trimming portions 504, 506 of the second data tracks may then be verified for accuracy.

Figure 6:
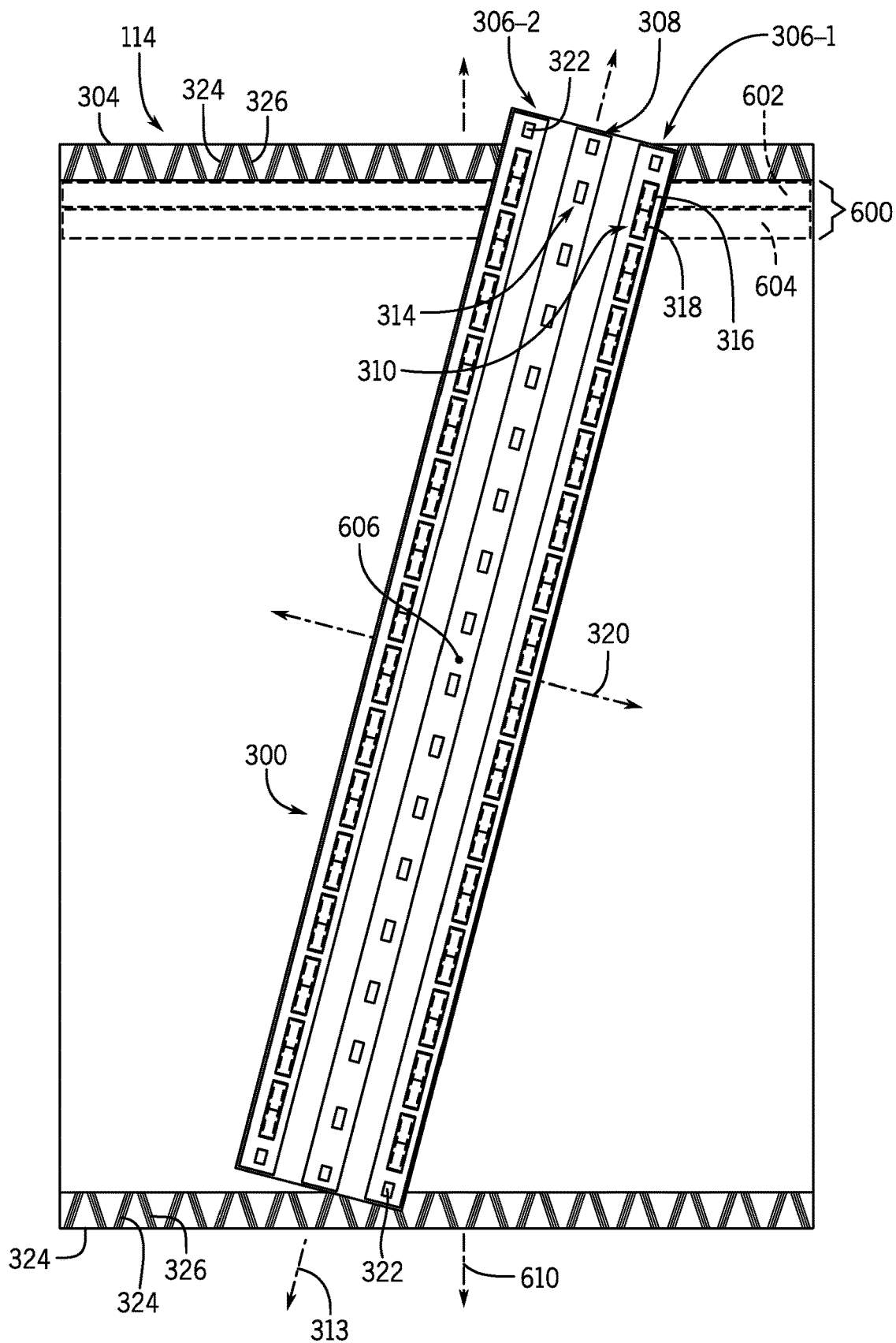
FIG. 6 illustrates the magnetic tape head of FIG. 3 oriented in a tilted position to read data written onto the magnetic tape, according to one or more embodiments of the disclosure.

Turning now to FIG. 6 with continued reference to FIGS. 1-3, FIG. 6 illustrates the magnetic tape head 300 of FIG. 3 oriented in a tilted position to read data written onto the magnetic tape 114 in order to verify the accuracy of the data, according to one or more embodiments. Like numbered items are as described with respect to FIGS. 1-3 and will not be discussed again in detail. Although a single data track 600 is illustrated in FIG. 6, it will be appreciated that multiple data tracks arranged in a shingled manner are contemplated.

The magnetic tape head 300 may be positioned at least to allow (i) a data write element 310 to write a data track 600 onto the length of the magnetic tape 114, and (ii) a data read element 314 to read a non-trimming portion 602 of the data track 600 that is to remain (i.e., not be trimmed) after another data track (not shown) is subsequently written onto the magnetic tape 114 such that it overwrites a portion (i.e., trims) data track 600. By doing so, the accuracy of the data written in the non-trimming portion 602 of the data track 600 by the data write element 310 may be verified in a single pass without a second read/verify pass. The data track 600 may be written onto the scratch portion 400 of the magnetic tape 114 prior to the data being written onto the data writing portion of the magnetic tape 114. The scratch portion 400 of the magnetic tape may be disposed between the tape leader and the data writing portion of the magnetic tape 114. In one or more embodiments, the data track 600 may be written onto the magnetic tape 114 to overwrite a previously written data track (not shown) on the scratch portion 400 of the magnetic tape 114. In another embodiment, the data track 600 may be written onto the data writing portion of the magnetic tape 114.

In one or more embodiments, the magnetic tape head 300 may be positioned via the actuator 214 (see FIG. 2) operatively coupled to the magnetic tape head 300 and a communication from the controller 218 (see FIGS. 2 and 7). As shown in FIG. 6, the magnetic tape head 300 has a zenith axis 606 (illustrated extending into the magnetic tape 114), where the zenith axis 606 is perpendicular to both the transverse axis 313 and the longitudinal axis 320 of the magnetic tape head 300. The actuator 214 may be configured, in response to a communication from the controller 218, to tilt the magnetic tape head 300 about the zenith axis 606 of the magnetic tape head 300 to a tilted position to align the data read element 314 with the non-trimming portion 602 of the data track 600. In one or more embodiments, the magnetic tape head 300 may be tilted about the zenith axis 606 of the magnetic tape head 300 up to about five minutes from the transverse axis 610 of the magnetic tape 114. In such a tilted orientation, the data write element 310 is capable of writing the data track 600 onto the magnetic tape 114, and the data read element 314 is capable of reading the non-trimming portion 602 of the data track 600 that is to be untrimmed if a second data track (not shown) is written onto the magnetic tape 114.

In one or more embodiments, the tape drive 102 may include a computer-readable storage medium (e.g., memory 702, FIG. 7) including instructions executable by the controller 218 to: tilt, with the actuator 214, the magnetic tape head 300 about the zenith axis 606 of the magnetic tape head 300 to a tilted position, the zenith axis 606 perpendicular to both the longitudinal axis 320 and the transverse axis 313 of the magnetic tape head 300 (block 703, FIG. 7); with the data write element 310, write a set of data onto the magnetic tape 114 as the data track 600, including the non-trimming portion 602 written by the first write portion 316 and the trimmable portion 604 written by the second write portion 318, with the data write element 310 in the tilted position in which the data read element 314 is disposed to read from a larger area of the non-trimming portion 602 than if the magnetic tape head 300 were in a nominal position (see FIG. 3) in which the longitudinal axis 320 were substantially parallel with the direction of travel of the magnetic tape 114 (block 704, FIG. 7); while the magnetic tape head 300 is in the tilted position, read from the non-trimming portion 602 of the data track 600 with the data read element 314 (block 706, FIG. 7); and determine, from the read data, whether the set of data was written to the non-trimming portion 602 of the data track 600 with a threshold level of accuracy (block 707, FIG. 7).

In one or more embodiments, the computer-readable storage medium may include further instructions executable by the controller 218 to: with the data write element 310, after the data track 600 is written, write another data track (not shown) onto the scratch portion 400 of the magnetic tape 114 to overwrite the trimmable portion 604 of the data track 600; read from the non-trimming portion 602 of the data track 600 with the data read element 314; and determine, from the read data, whether the set of data was written to the non-trimming portion 602 of the data track 600 with a threshold level of accuracy. In another embodiment, the computer-readable medium may include further instructions executable by the controller 218 to, in response to a detection that the tape drive 102 is to advance the magnetic tape 114 past a beginning of the magnetic tape 114 for the first time after the magnetic tape 114 is loaded into the tape drive 102, cause: the writing of the set of data onto the scratch portion 400 of the magnetic tape 114 as the data track 600; the reading from the non-trimming portion 602 of the data track 600 with the data read element 314; and the determining, from the read data, whether the set of data was written to the non-trimming portion 602 of the data track 600 with a threshold level of accuracy.

With reference to FIGS. 4-6, in one or more embodiments, the portion (e.g., 602 in FIG. 6) of the data track (e.g., 600 in FIG. 6) to remain untrimmed may be determined based on the width and desired number of the data tracks written onto the magnetic tape. The amount of overwrite or trimming can be determined from the foregoing, and thus the width of the non-trimming portion of each data track can be determined. Accordingly, the magnetic tape head 300 may be tilted or otherwise positioned (via servo elements 322) such that the data read element 314 is capable of reading the non-trimming portion of the respective data track.

Once the data is read by the data read element 314 in one of the example implementations set forth in FIGS. 4-6, the accuracy of the data may be verified to ensure that the data writing element 310 of the magnetic tape head 300 is operating as designed. Turning now to FIG. 7 with continued reference to FIGS. 1-6, FIG. 7 is a schematic of the tape drive 102 including the magnetic tape head 300 and control circuitry 700 communicably coupled to the magnetic tape head 300, according to one or more embodiments. The control circuitry 700 includes the controller 218 which controls the read/write operations of the tape drive 102. The control circuitry 700 may include memory 702 for maintaining a variety of executable instructions including write instructions 704, read instructions 706, and driver(s) 709 implemented by driver instructions 708. A write operation may be performed by the controller 218 executing write instructions 704. Data to be written onto the magnetic tape 114 are encoded by the controller 218 and transmitted to the driver 709. Similarly, a read operation may be performed by the controller 218 executing read instructions 706. A drive interface 710 permits connection to a host system 716 (e.g., computer 104 and/or network server 106).

The control circuitry 700 may also include an error correction engine 712 to determine, from the read data, whether the set of data was written to the non-trimming portion of the data track with a threshold level of accuracy based on a rate of invocation of error correction when reading from the non-trimming portion of the data track, and in some embodiments, at least one other data track. In one or more embodiments, the error correction engine 712 may comprise a set of instructions (e.g., programming) stored in memory 702 and executable by the controller 218 (e.g., hardware). In other embodiments, the error correction engine 712 may be any combination of hardware and programming to implement the functionalities of the error correction engine 712. In embodiments described herein, such combinations of hardware and programming may be implemented in a number of different ways. For example, the programming for the error correction engine 712 may be processor executable instructions stored on at least one non-transitory machine-readable storage medium and the hardware for the error correction engine 712 may include at least one processing resource to execute those instructions. In some examples, the hardware may also include other electronic circuitry to at least partially implement the error correction engine 712. In some examples, the at least one machine-readable storage medium may store instructions that, when executed by the at least one processing resource, at least partially implement some or all of the error correction engine 712. In such examples, a computing device may include the at least one machine-readable storage medium storing the instructions and the at least one processing resource to execute the instructions. In other examples, the error correction engine 712 may be implemented by electronic circuitry.

The data read by the data read element 314 is transmitted from the magnetic tape 114 to the magnetic tape head 300 via a tape/head interface 714 and conducted through the error correction engine 712. If the read data includes errors which are correctable by the error correction engine 712, the correction is made and the corrected data flows upstream through the controller 218. In one or more embodiments, the corrected data may be passed on to the host system 716. In other embodiments, the error-containing data may be corrected on the magnetic tape 114 by backing up and rewriting the corrected data over the error-containing data, or re-writing the corrected data to the magnetic tape 114 farther down the reel 112, and a notation may be included that the previously written data was in error. In the event the threshold level is exceeded, a second section of magnetic tape 114 may be tested utilizing a larger segment of data in order to ensure that the magnetic tape 114 has been successfully read.

The error correction engine 712 may be configured to detect and correct errors in a one-dimensional or multi-dimensional manner. For example, for one-dimensional error detection and correction, the error correction engine 712 may utilize portions of a single data track to determine an error, for example, via repetition schemes, parity checks, cyclic redundancy checks, or checksums, or the like. For example, in a linear tape-open (LTO) tape format, the error correction is performed using a Reed-Solomon error correction code, referred to as C1. In other embodiments, for multi-dimensional error detection and correction, the error correction engine 712 may utilize portions of multiple data tracks to determine an error, for example, via repetition schemes, parity checks, cyclic redundancy checks, or checksums, or the like. For example, in the LTO tape format, the error correction is performed using a Reed-Solomon error correction code, referred to as C2. In the LTO tape format, C2 correction can correct a data track from the information written on other data tracks.

Turning now to an example implementation of the error correction engine 712 utilizing the C1 and C2 error correction, data in a selected data track is checked with the C1 correction in the selected data track. If the check indicates the data is in error, the correction engine 712 attempts to correct the data using the C1 correction. Generally, the C1 correction is able to correct relatively small errors. If the C1 correction fails, the error correction engine 712 attempts to correct the errors using the C2 correction information from other data tracks.

The C2 correction information can be designed to recover data even if all data is missing from one or more data tracks if enough redundancy is designed into the tape format. For tape formats similar to LTO tape format, either or both of the rate of C1 invocation and the rate of C2 invocation can be used to determine whether a data set has been written with a threshold level of accuracy when evaluating the data on the non-trimming portion of the data track. Generally, the rate of C2 invocation has been found to be a better measure for this determination, as C1 may be invoked often for other causes such as media defects, or a marginal read head. Accordingly, in one or more embodiments, the rate of error invocation used to determine whether a data set has been written with a threshold level of accuracy may be based exclusively on the rate of C2 invocation in the error correction engine 712. One manner to determine the rate of C2 invocation is writing a sample of data and counting the number of times C2 is invoked. The sample of data should include enough written data that a tape drive 102 with a defective data write element 310 will have five or more C2 invocations, but a tape drive 102 with a satisfactory data write element 310 will have at most one or two C2 invocations. The foregoing will provide a clear identification of defective tape drives 102. In the event an error threshold is exceeded and the magnetic tape 114 is determined to operate as intended, the tape drive 102 may be taken out of service for further evaluation.

Figure 8:
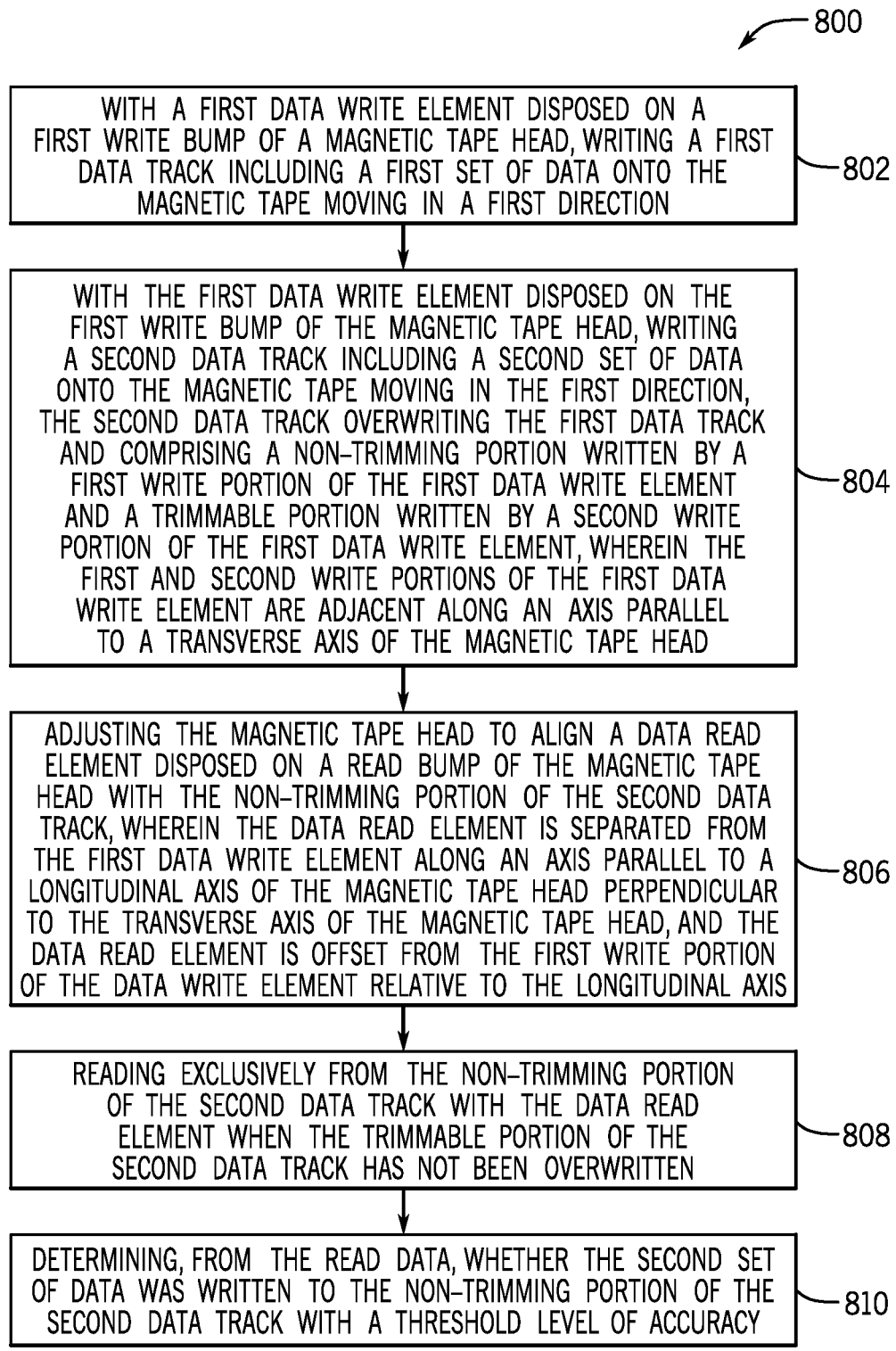
FIG. 8 is a flowchart depicting a method for verifying the accuracy of data written to a magnetic tape, according to one or more embodiments of the disclosure.

Referring now to FIG. 8 with continued reference to FIGS. 1-3 and 5, FIG. 8 is a flowchart depicting a method 800 for verifying the accuracy of data written to a magnetic tape, according to one or more embodiments. As at block 802, the method 800 may include, with a first data write element disposed on a first write bump of a magnetic tape head, writing a first data track including a first set of data onto the magnetic tape moving in a first direction. As at block 804, the method 800 may also include, with the first data write element disposed on the first write bump of the magnetic tape head, writing a second data track including a second set of data onto the magnetic tape moving in the first direction, the second data track overwriting the first data track and comprising a non-trimming portion written by a first write portion of the first data write element and a trimmable portion written by a second write portion of the first data write element, wherein the first and second write portions of the first data write element are adjacent along a transverse axis of the magnetic tape head.

As at block 806, the method 800 may further include adjusting the magnetic tape head to align a data read element disposed on a read bump of the magnetic tape head with the non-trimming portion of the second data track, wherein the data read element is separated from the first data write element along a longitudinal axis of the magnetic tape head perpendicular to the transverse axis of the magnetic tape head, and the data read element is offset from the first write portion of the data write element relative to the longitudinal axis. As at block 808, the method 800 may also include reading exclusively from the non-trimming portion of the second data track with the data read element when the trimmable portion of the second data track has not been overwritten. As at block 810, the method 800 may further include determining, from the read data, whether the second set of data was written to the non-trimming portion of the second data track with a threshold level of accuracy.

In one or more embodiments, adjusting the magnetic tape head to align the data read element disposed on the read bump of the magnetic tape head with the non-trimming portion of the second data track, as disclosed in method 800, may further include positioning the magnetic tape head, via one or more servo elements disposed on the read bump of the magnetic tape head, such that the data read element is offset from a longitudinal axis of the second data track. In one or more embodiments, the method 800 may also include determining, from the read data, whether the second set of data was written to the non-trimming portion of the second data track with a threshold level of accuracy based on a rate of invocation of error correction when reading from the non-trimming portion of the second data track.

In one or more embodiments, the method 800 may further include, with a second data write element disposed on a second write bump of a magnetic tape head, writing a third data track including a third set of data onto the magnetic tape moving in a second direction opposite the first direction. In one or more embodiments, the method 800 may include, with the second data write element disposed on the second write bump of the magnetic tape head, writing a fourth data track including a fourth set of data onto the magnetic tape moving in the second direction, the fourth data track overwriting the third data track and comprising a non-trimming portion written by a first write portion of the second data write element and a trimmable portion written by a second write portion of the second data write element, wherein the first and second write portions of the second data write element are adjacent along the transverse axis of the magnetic tape head. In one or more embodiments, the method 800 may include adjusting the magnetic tape head to align the data read element disposed on the read bump of the magnetic tape head with the non-trimming portion of the fourth data track, wherein the data read element is separated from the first data write element along the longitudinal axis of the magnetic tape head perpendicular to the transverse axis of the magnetic tape head. In one or more embodiments, the method 800 may include reading from the non-trimming portion of the fourth data track with the data read element. In one or more embodiments, the method 800 may include determining, from the read data, whether the fourth set of data was written to the non-trimming portion of the fourth data track with a threshold level of accuracy.

In another embodiment of the present disclosure, referred to hereafter as "embodiment A", a non-transitory computer-readable medium is provided and stores computer-executable instructions, which when executed, cause a computer to: with a first data write element disposed on a first write bump of a magnetic tape head, write a first data track including a first set of data onto the magnetic tape moving in a first direction, the first data track including a non-trimming portion written by a first write portion of the first data write element and a trimmable portion written by a second write portion of the first data write element, where the first and second write portions of the first data write element are adjacent along an axis parallel to a transverse axis of the magnetic tape head; adjust the magnetic tape head to align a data read element disposed on a read bump of the magnetic tape head with the non-trimming portion of the first data track, where the data read element is separated from the first data write element along an axis parallel to a longitudinal axis of the magnetic tape head, the longitudinal axis of the magnetic tape head is perpendicular to the transverse axis of the magnetic tape head, and the data read element is offset from the first write portion of the data write element relative to the longitudinal axis; read exclusively from the non-trimming portion of the first data track with the data read element when the trimmable portion of the first data track has not been overwritten; and determine, from the read data, whether the first set of data was written to the non-trimming portion of the first data track with a threshold level of accuracy.

In another embodiment of the present disclosure, the non-transitory computer-readable medium of embodiment A is provided, wherein the computer-executable instructions, which when executed, cause the computer to adjust the magnetic tape head to align the data read element disposed on the read bump of the magnetic tape head with the non-trimming portion of the first data track, further cause the computer to position the magnetic tape head, via one or more servo elements disposed on the read bump of the magnetic tape head, such that the data read element is offset from a longitudinal axis of the first data track.

In another embodiment of the present disclosure, referred to hereafter as "embodiment B", the non-transitory computer-readable medium of embodiment A is provided, wherein the computer-executable instructions, which when executed, further cause the computer to: with a second data write element disposed on a second write bump of a magnetic tape head, write a second data track including a second set of data onto the magnetic tape moving in a second direction opposite the first direction, the second data track comprising a non-trimming portion written by a first write portion of the second data write element and a trimmable portion written by a second write portion of the second data write element, wherein the first and second write portions of the second data write element are adjacent along the transverse axis of the magnetic tape head; adjust the magnetic tape head to align the data read element disposed on a read bump of the magnetic tape head with the non-trimming portion of the second data track, wherein the data read element is separated from the first data write element of the second data write element along the longitudinal axis of the magnetic tape head; read exclusively from the non-trimming portion of the second data track with the data read element when the trimmable portion of the second data track has not been overwritten; and determine, from the read data, whether the second set of data was written to the non-trimming portion of the second data track with a threshold level of accuracy.

In another embodiment of the present disclosure, the non-transitory computer-readable medium of embodiment B is provided, wherein the computer-executable instructions, which when executed, cause the computer to adjust the magnetic tape head to align the data read element disposed on the read bump of the magnetic tape head with the non-trimming portion of the second data track, further cause the computer to position the magnetic tape head, via the one or more servo elements disposed on the read bump of the magnetic tape head, such that the data read element is offset from a longitudinal axis of the second data track.

In another embodiment of the present disclosure, the non-transitory computer-readable medium of embodiment B is provided, wherein each of the first data track and the second data track is written onto a scratch portion of the magnetic tape, the scratch portion disposed between a tape leader and a data writing portion of the magnetic tape.

In another embodiment of the present disclosure, referred to hereafter as "embodiment C", the non-transitory computer-readable medium of embodiment B is provided, wherein in response to a detection that the tape drive is to advance the magnetic tape past a beginning of the magnetic tape for the first time after the magnetic tape is loaded into the tape drive, cause: the writing of the set of data onto the scratch portion of the magnetic tape as the first data track; the reading from the non-trimming portion of the first data track with the data read element; and the determining, from the read data, whether the set of data was written to the non-trimming portion of the first data track with a threshold level of accuracy.

In another embodiment of the present disclosure, the non-transitory computer-readable medium of embodiment B is provided, wherein the computer-executable instructions, which when executed, further cause the computer to determine, from the read data, whether the first set of data was written to the non-trimming portion of the first data track with a threshold level of accuracy based on a rate of invocation of error correction when reading from the non-trimming portion of the first data track and the second data track.

In another embodiment of the present disclosure, the non-transitory computer-readable medium of embodiment A is provided, wherein the computer-executable instructions, which when executed, further cause the computer to determine, from the read data, whether the first set of data was written to the non-trimming portion of the first data track with a threshold level of accuracy based on a rate of invocation of error correction when reading from the non-trimming portion of the first data track.

In another embodiment of the present disclosure, the non-transitory computer-readable medium of embodiment B is provided, wherein the read bump is disposed between the first write bump and the second write bump.

In another embodiment of the present disclosure, referred to hereafter as "embodiment D", a method is provided for verifying the accuracy of data written to a magnetic tape. The method may include, with a first data write element disposed on a first write bump of a magnetic tape head, writing a first data track including a first set of data onto the magnetic tape moving in a first direction. The method may also include, with the first data write element disposed on the first write bump of the magnetic tape head, writing a second data track including a second set of data onto the magnetic tape moving in the first direction, the second data track overwriting the first data track and including a non-trimming portion written by a first write portion of the first data write element and a trimmable portion written by a second write portion of the first data write element, where the first and second write portions of the first data write element are adjacent along an axis parallel to a transverse axis of the magnetic tape head. The method may further include adjusting the magnetic tape head to align a data read element disposed on a read bump of the magnetic tape head with the non-trimming portion of the second data track, where the data read element is separated from the first data write element along an axis parallel to a longitudinal axis of the magnetic tape head perpendicular to the transverse axis of the magnetic tape head, and the data read element is offset from the first write portion of the data write element relative to the longitudinal axis. The method may also include reading exclusively from the non-trimming portion of the second data track with the data read element when the trimmable portion of the second data track has not been overwritten, and determining, from the read data, whether the second set of data was written to the non-trimming portion of the second data track with a threshold level of accuracy.

In another embodiment of the present disclosure, the method of embodiment D is provided, wherein adjusting the magnetic tape head to align the data read element disposed on the read bump of the magnetic tape head with the non-trimming portion of the second data track may further include positioning the magnetic tape head, via one or more servo elements disposed on the read bump of the magnetic tape head, such that the data read element is offset from a longitudinal axis of the second data track.

In another embodiment of the present disclosure, the method of embodiment D is provided and may further include determining, from the read data, whether the second set of data was written to the non-trimming portion of the second data track with a threshold level of accuracy based on a rate of invocation of error correction when reading from the non-trimming portion of the second data track.

In another embodiment of the present disclosure, the method of embodiment D is provided and may further include: with a second data write element disposed on a second write bump of a magnetic tape head, writing a third data track including a third set of data onto the magnetic tape moving in a second direction opposite the first direction;

with the second data write element disposed on the second write bump of the magnetic tape head, writing a fourth data track including a fourth set of data onto the magnetic tape moving in the second direction, the fourth data track overwriting the third data track and comprising a non-trimming portion written by a first write portion of the second data write element and a trimmable portion written by a second write portion of the second data write element, wherein the first and second write portions of the second data write element are adjacent along the transverse axis of the magnetic tape head; adjusting the magnetic tape head to align the data read element disposed on the read bump of the magnetic tape head with the non-trimming portion of the fourth data track, wherein the data read element is separated from the first data write element along the longitudinal axis of the magnetic tape head perpendicular to the transverse axis of the magnetic tape head; reading from the non-trimming portion of the fourth data track with the data read element; and determining, from the read data, whether the fourth set of data was written to the non-trimming portion of the fourth data track with a threshold level of accuracy.

Example embodiments may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A tape drive comprising:
a magnetic tape head comprising a data write element and a data read element, the data write element having a first write portion and a second write portion, and the data read element offset from the first write portion of the data write element;
an actuator to adjust a position of the magnetic tape head; and
a controller to:
cause tilting, with the actuator, of the magnetic tape head to a tilted position in which the magnetic tape head is tilted with respect to a direction of travel of a magnetic tape;
cause writing, with the data write element, of a set of data onto the magnetic tape as a first data track, the first data track comprising a non-trimming portion written by the first write portion and a trimmable portion written by the second write portion;
while the magnetic tape head is in the tilted position, read from the non-trimming portion of the first data track with the data read element; and
determine, from the read data, whether the set of data was written to the non-trimming portion of the first data track with a threshold level of accuracy.

2. The tape drive of claim 1, wherein:
in response to a communication from the controller, the actuator is to tilt the magnetic tape head up to about five minutes from a transverse axis of the magnetic tape, the transverse axis perpendicular to the direction of travel of the magnetic tape.

3. The tape drive of claim 1, wherein the controller is to:
cause writing, with the data write element, of the set of data onto a scratch portion of the magnetic tape as the first data track, the scratch portion disposed between a tape leader and a data writing portion of the magnetic tape.

4. The tape drive of claim 3, wherein the first data track is written to overwrite a previously written data track on the magnetic tape.

5. The tape drive of claim 3, wherein the controller is to:
cause writing, with the data write element after the first data track is written to the magnetic tape, of a second data track onto the scratch portion of the magnetic tape to overwrite the trimming portion of the first data track;
read from the non-trimming portion of the first data track with the data read element after the writing of the second data track.

6. The tape drive of claim 3, wherein the controller is to:
in response to a detection that the tape drive is to advance the magnetic tape past a beginning of the magnetic tape for a first time after the magnetic tape is loaded into the tape drive, cause:
the writing of the set of data onto the scratch portion of the magnetic tape as the first data track;
the reading from the non-trimming portion of the first data track with the data read element; and
the determining, from the read data, whether the set of data was written to the non-trimming portion of the first data track with the threshold level of accuracy.

7. The tape drive of claim 1, wherein the controller is to:
cause writing, with the data write element, of data onto a data writing portion of the magnetic tape as the first data track, the data writing portion disposed between a scratch portion of the magnetic tape and an end of the magnetic tape.

8. The tape drive of claim 7, wherein the controller is to:
cause writing, with the data write element, of a second data track onto the magnetic tape to overwrite the trimmable portion of the first data track.

9. The tape drive of claim 8, wherein the controller is to:
determine, from the read data, whether the set of data was written to the non-trimming portion of the first data track with the threshold level of accuracy based on a rate of invocation of error correction when reading from the non-trimming portion of the first data track and the second data track.

10. The tape drive of claim 1, wherein the controller is to:
determine, from the read data, whether the set of data was written to the non-trimming portion of the first data track with the threshold level of accuracy based on a rate of invocation of error correction when reading from the non-trimming portion of the first data track.

11. The tape drive of claim 10, wherein the rate of invocation of error correction is a rate of invocation of C2 error correction that is to correct data in the first data track based on information written on other data tracks of the magnetic tape.

12. The tape drive of claim 1, wherein the controller is to:
while the magnetic tape head is in the tilted position, read exclusively from the non-trimming portion of the first data track with the data read element while writing the set of data onto the magnetic tape as the first data track.

13. The tape drive of claim 1, wherein the magnetic tape head has a longitudinal axis along which a plurality of data write elements extend, and wherein in the tilted position the longitudinal axis is tilted with respect to the direction of travel of the magnetic tape.

14. The tape drive of claim 13, wherein the magnetic tape head has a zenith axis about which the magnetic tape head is rotatable from a first position to the tilted position, the zenith axis perpendicular to the longitudinal axis and the direction of travel of the magnetic tape.

15. A non-transitory machine-readable storage medium comprising instructions that upon execution cause a controller to:
cause tilting, with an actuator, of a magnetic tape head to a tilted position in which the magnetic tape head is tilted with respect to a direction of travel of a magnetic tape, the magnetic tape head comprising a data write element and a data read element, the data write element having a first write portion and a second write portion, and the data read element offset from the first write portion of the data write element;
cause writing, with the data write element, of a set of data onto the magnetic tape as a first data track, the first data track comprising a non-trimming portion written by the first write portion and a trimmable portion written by the second write portion;
while the magnetic tape head is in the tilted position, read from the non-trimming portion of the first data track with the data read element; and
determine, from the read data, whether the set of data was written to the non-trimming portion of the first data track with a threshold level of accuracy.

16. The non-transitory machine-readable storage medium of claim 15, wherein the magnetic tape head has a longitudinal axis along which a plurality of data write elements extend, and wherein in the tilted position the longitudinal axis is tilted with respect to the direction of travel of the magnetic tape.

17. The non-transitory machine-readable storage medium of claim 15, wherein the magnetic tape head has a zenith axis about which the magnetic tape head is rotatable from a first position to the tilted position, the zenith axis perpendicular to the longitudinal axis and the direction of travel of the magnetic tape.

18. The non-transitory machine-readable storage medium of claim 15, wherein the instructions upon execution cause the controller to:
while the magnetic tape head is in the tilted position, read exclusively from the non-trimming portion of the first data track with the data read element while writing the set of data onto the magnetic tape as the first data track.

19. A method comprising:
tilting, with an actuator, a magnetic tape head to a tilted position in which the magnetic tape head is tilted with respect to a direction of travel of a magnetic tape, the magnetic tape head comprising a data write element and a data read element, the data write element having a first write portion and a second write portion, and the data read element offset from the first write portion of the data write element;
writing, with the data write element, a set of data onto the magnetic tape as a first data track, the first data track comprising a non-trimming portion written by the first write portion and a trimmable portion written by the second write portion;
while the magnetic tape head is in the tilted position, reading from the non-trimming portion of the first data track with the data read element; and
determining, from the read data, whether the set of data was written to the non-trimming portion of the first data track with a threshold level of accuracy.

20. The method of claim 19, wherein the magnetic tape head has a longitudinal axis along which a plurality of data write elements extend, and wherein in the tilted position the longitudinal axis is tilted with respect to the direction of travel of the magnetic tape, and wherein the magnetic tape head has a zenith axis about which the magnetic tape head is rotatable from a first position to the tilted position, the zenith axis perpendicular to the longitudinal axis and the direction of travel of the magnetic tape.

* * * * *